Jan. 13, 1931.  R. D. MAILEY ET AL  1,789,011
GLASS WORKING MACHINERY
Filed Jan. 25, 1927   2 Sheets-Sheet 1

INVENTOR
Roy D. Mailey
Alfred J. Zimringhoff
BY
Thos. A. Brown
THEIR ATTORNEY

Jan. 13, 1931.  R. D. MAILEY ET AL  1,789,011
GLASS WORKING MACHINERY
Filed Jan. 25, 1927  2 Sheets-Sheet 2

Patented Jan. 13, 1931

1,789,011

UNITED STATES PATENT OFFICE

ROY D. MAILEY, OF EAST ORANGE, AND WILFORD J. WINNINGHOFF, OF SOUTH ORANGE, NEW JERSEY, ASSIGNORS TO GENERAL ELECTRIC VAPOR LAMP COMPANY, OF HOBOKEN, NEW JERSEY, A CORPORATION OF NEW JERSEY

GLASS-WORKING MACHINERY

Application filed January 25, 1927. Serial No. 163,370.

The present invention relates to apparatus and machinery for working glass and particularly for joining together hollow pieces of glass.

Various objects and advantages of the invention will be obvious from the following particular description of one form of apparatus embodying the invention or from an inspection of the accompanying drawings; and the invention also consists in certain new and useful features of construction and combinations of parts hereinafter set forth and claimed.

In the accompanying drawings there is shown for purposes of illustration one form of apparatus embodying the invention, in which—

Figures 1, 3:
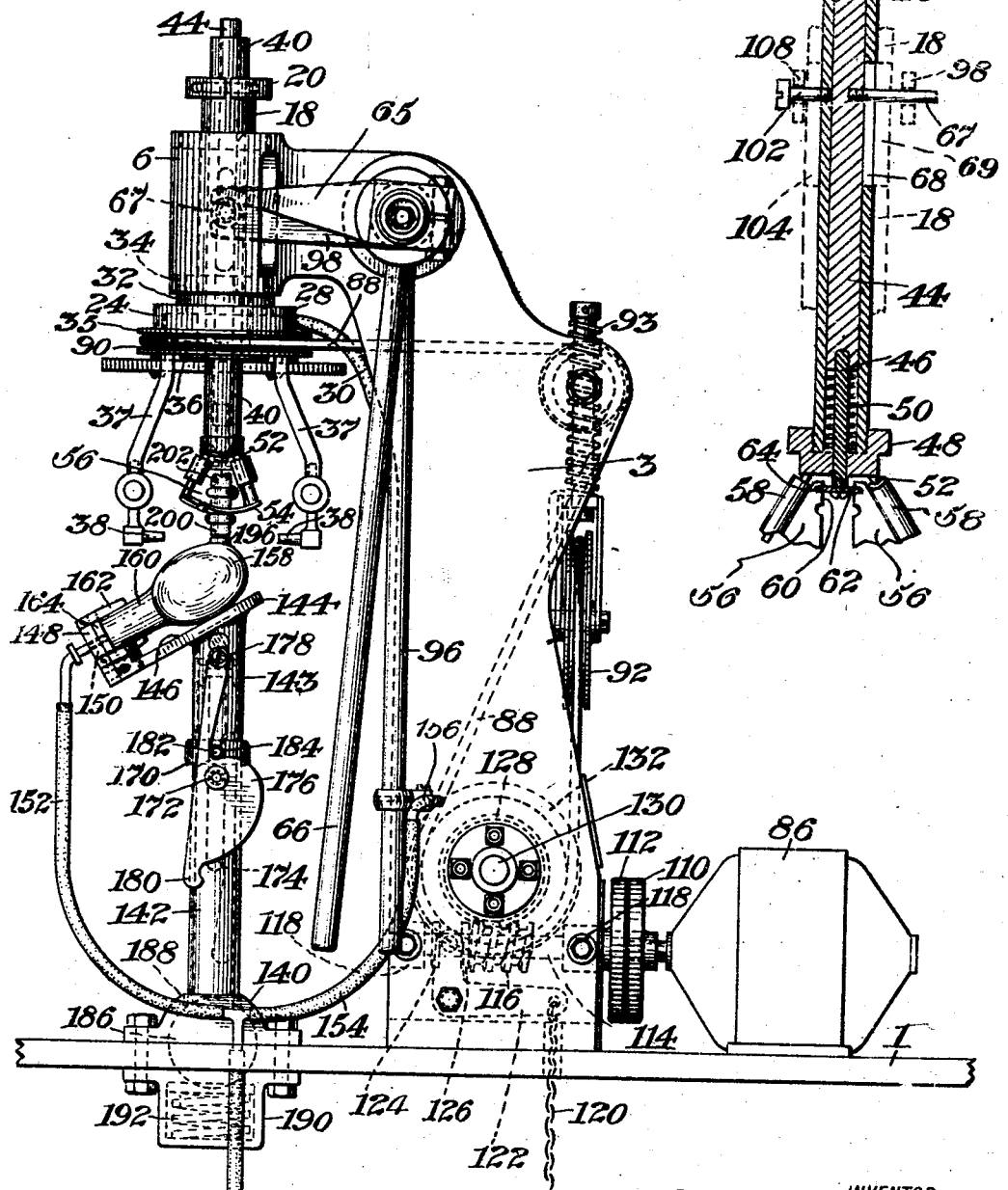
Figure 2:
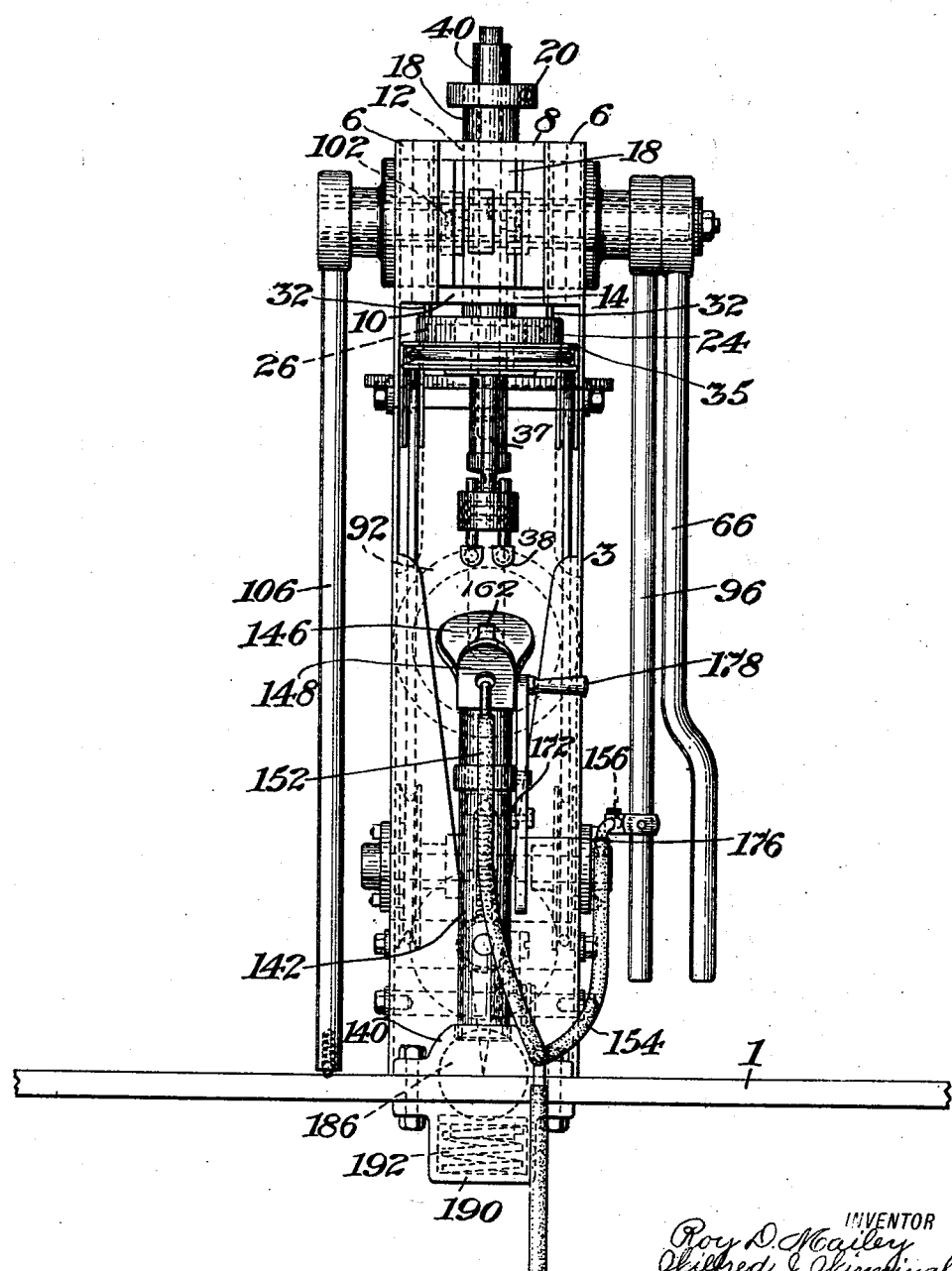

Fig. 1 is a side elevation view thereof,
Fig. 2 is a front elevation view thereof, and
Fig. 3 is a sectional view of the chuck.

In the drawings the table 1 carries the upright support 3 from the upper end of which extends forwardly the pair of arms 6, 6 which carry the vertical bearing members comprising the horizontal plates 8 and 10 one above the other and with the pair of aligned vertical circular bearing openings 12 and 14 therethrough. A vertical hollow shaft 18 extends through said openings 12 and 14 and is slidable longitudinally therein. A collar 20 fixed to the upper end of said shaft 18 limits the downward movement thereof in said bearing members 8 and 10.

Near the lower end of said hollow shaft 18 and below said bearing member 10 is mounted the annular flange 24 having the annular channel 26 formed in the lower face thereof. A lateral opening 28 connects annular channel 26 to a flexible hose 30 and thereby to a source of heating gas not shown. The pins 32, 32 fixed to the upper side of said annular flange 24 and extending upwardly through holes 34, 34 in said member 10 serve to keep said annular flange 24 from rotational movement while permitting longitudinal movement thereof along the axis of said hollow shaft 18. A second annular flange 35 in the form of a grooved pulley is rotatably mounted about said hollow shaft 18 below said annular flange 24, a third annular flange 36 fixed to the lower end of said hollow shaft 18 serving to hold said pulley flange 35 in position. Said pulley flange 35 carries a pair of downwardly extending pipes 37, 37 which terminate in sets of inwardly projecting gas jets 38, 38. Said pipes 37, 37 register through openings in said pulley 35 with said annular channel 26 and thereby with said supply hose 30 in any rotational position of said jets 38, 38 with respect to said flange 24 which is fixed against rotational movement. The weight of said flange 24 causing it to rest on said flange 35 serves together with oil used for lubrication between these flanges to seal said channel 26 against leakage of gas therefrom between these flanges. Another hollow shaft 40 which is slidable longitudinally within said hollow shaft 18 carries and forms with other parts a clamping device and actuating means therefor comprising a spindle 44 which extends into shaft 40 with a sliding fit and carries at its lower end a smaller spindle 46 which extends through an annular cap 48 fixed to the lower end of shaft 40. The opening through hollow shaft 40 is in the from illustrated uniform throughout so that a space is left between the interior wall thereof and spindle 46 in which space is mounted about spindle 46 the compression spring 50 which presses against the bottom end of spindle 44 and against the inner face of cap 48 and tends to move said spindles 44 and 46 upwardly. Fixed to said cap 48 and extending radially therefrom at an angle to the axis of shaft 40 are a plurality, preferably four, of rods 52, 52 which are connected at their outer ends by the horseshoe shaped plate 54 which presents the opening at the front. On each of rods 52, 52 is slidably mounted a clamping member 56 which carries a boss 58 having an opening therethrough through which the respective rod 52 extends. As shown each of the members 56 is a flat plate having vertical inner edges 60, 60 facing toward a common center and movable toward and from each other and adapted to clamp straight sided objects of various sizes such as glass rods or tubing.

Clamping and unclamping movement is imparted to the members 56, 56 by means of the member 62 which is attached to the lower end of said vertically movable spindle 46 and which slidably engages the upper and lower surfaces of horizontal slots 64, 64 formed in respective members 56, 56 near the upper ends thereof. The inclination of said rods 52, 52 from the vertical causes members 56, 56 to move toward and from each other horizontally as said member 62 bears against either upper or lower surfaces of said slots 64 respectively.

Said member 62 is actuated for moving members 56, 56 in clamping movement by said spring 50 which tends to move spindles 44 and 46 and said member 62 upwardly. Unclamping movement is imparted to the members 56, 56 by means of the lever 65 which through handle 66 can be made to bear on the upper side of a stud 67 fixed to said spindle 44 and extending through a longitudinal slot 68 in said shaft 40 and a slot 69 in shaft 18. This unclamping pressure is applied against the pressure of spring 50.

Rotation is imparted to flange 35 and jets 38, 38 by means of motor 86 and the belt 88 which rides in the annular groove 90 formed around flange 35. The sheave 92 tightened by spring 93 serves to hold said belt 88 at a suitable tension when the jets 38, 38 and flanges 24 and 35 are raised and lowered. Raising and lowering of the jets 38, 38 is achieved by means of handle 96 and arm 98 which connect with said shaft 18. Said shaft 40 and clamping elements carried thereby are movable vertically by means of a stud 102 fixed in said shaft 40 and extending through the slot 104 on the side of said hollow shaft 18 near the stud 67, shaft 40 actuation being imparted through the handle 106 which carries a fork member 108 which engages said stud 102 either side thereof.

Control of the rotation of said jets 38, 38 by said motor 86 is maintained through the clutch member 110 mounted to the shaft of said motor 86 and a cooperating clutch member 112 mounted on a shaft 114. Said shaft 114 carries a worm 116 movable longitudinally thereon for a short distance but fixed against rotational movement with respect thereto and said shaft 114 is itself slidable longitudinally in its bearings 118, 118 to engage and disengage said clutch member 112 with and from the said clutch member 110, actuation thereof for this purpose being secured by the chain 120 connecting to a foot pedal not shown, the crank 122 and the flanges 124, 126 fixed to said shaft 114 and positioned on either side of the upper end of said bell crank 122. Said worm 116 meshes with a pinion 128 mounted to a rotatable shaft 130 which also carries a driving pulley 132 which engages said belt 88.

Below and centrally located with respect to said clamping members 56, 56 is mounted to table 1 the hollow casting 140 which carries the upwardly extending hollow standard 142 in which is slidably mounted the support standard 143 which at its upper end carries the plate member 144 having an inclined upper surface 146. At its lower edge said plate 144 carries at right angles therewith the upwardly extending plate 148 which has an opening 150 therethrough to which is connected a hose 152 which connects to a source of air pressure not shown. The by-pass 154 from said hose 152 terminates in a tube 156 mounted on said handle 96 and serves to control the air pressure in a piece of hollow glassware mounted on said plate 144 with the opening thereof registering with said opening 150. Such a hollow piece of glassware is shown on said plate 144 and comprises the bulb 158 having a tube 160 formed thereto and is held in place by means of the spring members 162, 162 mounted on said plate 148 and engaging the sides of said tube 160. A piece of felt or other resilient material 164 mounted on said plate 148 and having an opening therethrough registering with said opening 150 serves to close the end of said tube 160 against escape of air therefrom.

Said standard 143 which is slidable in said hollow standard 142 has a shoulder 170 which rests on the upper end of said standard 142 to limit the downward movement thereof. Standard 142 carries a stud 172 which extends laterally and outwardly and also inwardly within the limits of a longitudinal slot 174 formed in said standard 143. Pivoted on said stud 172 is the cam 176 having the handle member 178 and the stop member 180 at opposite ends thereof, the cam being pivoted near the handle end on said stud. On said standard 143 near the shoulder 170 is the pin 182 carrying the roller 184 which rides on the upper surface of said cam 176, whereby said cam 176 on said pin 172 in the position indicated in Fig. 1 on being rotated in a counter clockwise direction will raise said standard 143 and said plate 144 upwardly.

Said hollow casting 140 carries said standard 142 by means of a ball 186 attached to the lower end of standard 142 and mounted within said hollow casting 140, said standard 142 extending through an opening 188 in said casting 140, which opening is a little larger than the diameter of the standard 142 but smaller than the diameter of said ball 186. Fixed to said table 1 and said hollow casting 140 is another hollow casting 190 which carries therein the compression spring 192 which bears at one end against the bottom of said casting 190 and at its upper end against the ball 186 and serves to frictionally hold said standard 142 by means of said ball 186 in any position to which it may be moved as permitted by the limits of said opening 188.

In the use and operation of the embodiment of the invention illustrated for joining two pieces of hollow glassware the operation can be as follows: A hollow glass bulb 158 having a stem 160 formed thereon near one end and a tubular blow-out 196 formed near its other end is mounted on said plate 144 with said tube 160 mounted between the spring clamping fingers 162, 162 and against said piece of felt 164 with said opening 196 directed upwardly. Another hollow glass member 200 having one end closed and an electrode wire 202 sealed in at the closed end is mounted between said clamping jaws 56, 56 with the open end down. Said opening 196 is aligned with respect to the lower end of said tube 200 by moving the supporting standard 142 about on its ball and socket support, said bulb 158 being raised to a position in which said opening 196 is close to said tube 200 by means of said cam 176, which position is between the flames of said jets 38, 38, and further alignment is made when necessary by further lateral movement of said standard 142. By means of said handles 96 and 106 respectively said tube 200 and the fires on said jets 38, 38 are brought into operative position with respect to said opening 196, the fires being rotated meanwhile. When the glass at these parts has become sufficiently fused the tube 200 is dropped downwardly against the glass at said opening 196 and the fused glasses are welded together, pressure within the hollow parts being regulated to shape the molten glass to the desired form by the application of a finger of the operator to said by-pass opening 156. At this time further alignment when necessary can be made of said tube 200 and said opening 196 by lateral movement of standard 142 to properly position said tube 200 with respect to said bulb 158 and tube 160. The glass parts described herein in the example of operation of the embodiment of the invention illustrated comprise the mercury cathode bulb of a mercury vapor arc lamp with an electrode seal-in spliced thereto and a tube thereon for sealing to the cylindrical tube which encloses the arc space of such a lamp. When the seal-in of said tube 200 to bulb 158 is completed said clamp members 56, 56 are opened through said handle 66 and standard 143 is lowered by returning said cam 176 to its original position. The tube 160 is then released from the clamp members 162, 162 and new parts inserted in the machine for the continuation of the splicing operations.

While we have shown and described and have pointed out in the annexed claim certain novel features of the invention, it will be understood that various omissions, substitutions and changes in the forms and details of the device illustrated and in its operation may be made by those skilled in the art without departing from the spirit of the invention.

We claim:

In a machine for joining hollow glass, means for holding two pieces of hollow glass in alignment, means for relatively moving pieces held by said holding means relatively toward and from each other, means for moving pieces in said holding means relatively transversely of each other comprising a support member for one of said glass holding means and a ball and socket joint in said support member, means for heating glassware held in said holding means, and means for applying and for varying air pressure in said glass pieces.

Signed respectively at South Orange and Hoboken, in the counties of Essex and Hudson and State of New Jersey, this 21st day of January, A. D. 1927.

WILFORD J. WINNINGHOFF.
ROY D. MAILEY.